(12) United States Patent
Mostov

(10) Patent No.: US 12,160,357 B2
(45) Date of Patent: *Dec. 3, 2024

(54) METHOD, APPARATUS AND COMPUTER PROGRAM PRODUCT FOR IMPROVING DYNAMIC RETRY OF RESOURCE SERVICE

(71) Applicant: Bytedance Inc., Wilmington, DE (US)

(72) Inventor: Michael Mostov, Chicago, IL (US)

(73) Assignee: Bytedance Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,403

(22) Filed: Sep. 5, 2023

(65) Prior Publication Data

US 2024/0080252 A1 Mar. 7, 2024

Related U.S. Application Data

(63) Continuation of application No. 17/661,191, filed on Apr. 28, 2022, now Pat. No. 11,784,901, which is a continuation of application No. 16/510,373, filed on Jul. 12, 2019, now Pat. No. 11,343,165.

(60) Provisional application No. 62/697,791, filed on Jul. 13, 2018.

(51) Int. Cl.
*H04L 43/0805* (2022.01)
*H04L 41/06* (2022.01)
*H04L 43/16* (2022.01)
*H04L 47/70* (2022.01)

(52) U.S. Cl.
CPC .......... *H04L 43/0805* (2013.01); *H04L 41/06* (2013.01); *H04L 43/16* (2013.01); *H04L 47/82* (2013.01)

(58) Field of Classification Search
CPC ..... H04L 43/0805; H04L 43/16; H04L 41/06; H04L 47/82

See application file for complete search history.

(56) References Cited

U.S. PATENT DOCUMENTS

| 6,070,190 A | * | 5/2000 | Reps | .................. H04L 41/5009 709/224 |
| 8,452,866 B2 | | 5/2013 | De et al. | |
| 2012/0144015 A1 | * | 6/2012 | Jalan | ...................... H04L 67/56 709/224 |

(Continued)

OTHER PUBLICATIONS

U.S. Appl. No. 17/661,191, filed Apr. 28, 2022, U.S. Pat. No. 11,784,901, Issued.

(Continued)

*Primary Examiner* — James E Springer
*Assistant Examiner* — Patrick F Ngankam
(74) *Attorney, Agent, or Firm* — ALSTON & BIRD LLP

(57) ABSTRACT

Methods, apparatuses and computer program products for implementing dynamic retry of a resource service in a network system are provided. An example method may include: transmitting a first service request to the resource service, determining a first service availability indicator, calculating a first service availability estimate associated with the resource service based on the first service availability indicator, and determining whether to transmit a second service request based on the first service availability estimate. The example method may be repeated by an example apparatus continuously for each transmitted service request.

20 Claims, 8 Drawing Sheets

(56) References Cited

U.S. PATENT DOCUMENTS

| | | | |
|---|---|---|---|
| 2014/0122695 A1* | 5/2014 | Kulikov | H04L 41/5054 |
| | | | 709/224 |
| 2015/0365341 A1 | 12/2015 | Mittal et al. | |
| 2017/0083831 A1* | 3/2017 | Ghosh | G06Q 10/02 |
| 2017/0272343 A1 | 9/2017 | Giles | |
| 2019/0342144 A1 | 11/2019 | Reeser | |

OTHER PUBLICATIONS

U.S. Appl. No. 16/510,373, filed Jul. 12, 2019, U.S. Pat. No. 11,343,165, Issued.

Jacobs "How It Works—Netflix/Hystrix Wiki", https://github.com/Netflix/Hystrix/wiki/How-it-Works#CircuitBreaker (Year: 2017).

Kalman filter—Wikipedia [online][retrieved Jul. 8, 2019]. Retrieved from the Internet: <URL: https://en.wikipedia.org/wiki/Kalman_filter>. (dated Jul. 4, 2019) 31 pages.

Kalyvianaki et al., Self-Adaptive and Self-Configured CPU Resource Provisioning for Virtualized Servers Using Kalman Filter, Jun. 19, 2009, ACM 978-1-60558-564-2/09/06, pp. 117-126. (Year: 2009).

Markov property—Wikipedia [online][retrieved Aug. 15, 2019]. Retrieved from the Internet: <URL:https://en.wikipedia.org/wiki/Markov property>. (dated Aug. 1, 2019) 4 pages.

\* cited by examiner

METHOD, APPARATUS AND COMPUTER PROGRAM PRODUCT FOR IMPROVING DYNAMIC RETRY OF RESOURCE SERVICE

CROSS-REFERENCE TO RELATED APPLICATION

The present application is a continuation of U.S. patent application Ser. No. 17/661,191, titled "Method, Apparatus and Computer Program Product for Improving Dynamic Retry of Resource Service," filed Apr. 28, 2022, which is a continuation of U.S. patent application Ser. No. 16/510,373, titled "Method, Apparatus And Computer Program Product for Improving Dynamic Retry Of Resource Service," filed Jul. 12, 2019, which claims priority to U.S. Provisional Patent Application No. 62/697,791, titled "Method, Apparatus And Computer Program Product for Improving Dynamic Retry Of Resource Service," filed Jul. 13, 2018, the entire contents of all of which are incorporated by reference in their entirety.

BACKGROUND

Network resources have varying availability. Applicant has identified many deficiencies and problems associated with existing methods, apparatuses, and systems related to servicing network resource requests.

BRIEF SUMMARY

In general, embodiments of the present disclosure provide methods, apparatuses, systems, computing devices, and/or the like for improving real-time availability estimates and providing dynamic retry for resource services of network systems.

In accordance with one aspect, an apparatus for implementing dynamic retry of a resource service in a network system is provided. The apparatus comprises at least one processor and at least one non-transitory memory storing program code, the at least one non-transitory memory and the program code being configured to, with the at least one processor, cause the apparatus to at least: transmit a first service request to the resource service; determine a first service availability indicator, wherein the first service availability indicator is indicative of whether the resource service is available to respond to the first service request; calculate a first service availability estimate associated with the resource service based on the first service availability indicator; and determine whether to transmit a second service request based on the first service availability estimate.

In accordance with another aspect, determining the first service availability indicator further comprises: determining that no service response is received within a predetermined time period subsequent to transmitting the first service request; and generating the first service availability indicator indicating that the resource service is not available.

In accordance with another aspect, determining whether to transmit the second service request further comprises: retrieving a service availability threshold associated with the resource service; and determining whether the first service availability estimate satisfies the service availability threshold.

In accordance with another aspect, determining whether to transmit the second service request further comprises: determining that the first service availability estimate satisfies the service availability threshold; and in response to determining that the first service availability estimate satisfies the service availability threshold, transmitting the second service request to the resource service.

In accordance with another aspect, determining whether to transmit the second service request further comprises: determining that the first service availability estimate does not satisfy the service availability threshold; and in response to determining that the first service availability estimate does not satisfy the service availability threshold, triggering generation of an electronic indication that the second service request is not transmitted.

In accordance with another aspect, the at least one non-transitory memory and the program code are configured to, with the at least one processor, cause the apparatus to further: generate an entry to a log file associated with the resource service, wherein the log file indicates a failure count associated with the resource service.

In accordance with another aspect, the at least one non-transitory memory and the program code are configured to, with the at least one processor, cause the apparatus to further: determine, based on the log file, whether the failure count satisfies a failure alert threshold associated with the resource service; and in response to determining that the failure count satisfies the failure alert threshold, trigger generation of an electronic alert.

In accordance with another aspect, the at least one non-transitory memory and the program code are configured to, with the at least one processor, cause the apparatus to further: continuously transmit subsequent service requests to the resource service; determine a service availability indicator, wherein the service availability indicator is indicative of whether the resource service is available to respond to each subsequent service request; calculate a service availability estimate associated with the resource service based on the service availability indicator; and determine whether to transmit a further subsequent service request based on the service availability estimate.

In accordance with another aspect, a computer-implemented method for implementing dynamic retry of a resource service in a network system is provided. The method comprises: transmitting a first service request to the resource service; determining a first service availability indicator, wherein the first service availability indicator is indicative of whether the resource service is available to respond to the first service request; calculating a first service availability estimate associated with the resource service based on the first service availability indicator; and determining whether to transmit a second service request based on the first service availability estimate.

In accordance with another aspect, a computer program product for implementing dynamic retry of a resource service in a network system is provided. The computer program product comprises at least one non-transitory computer-readable storage medium having computer-readable program code portions stored therein. The computer-readable program code portions comprise an executable portion configured to: transmit a first service request to the resource service; determine a first service availability indicator, wherein the first service availability indicator is indicative of whether the resource service is available to respond to the first service request; calculate a first service availability estimate associated with the resource service based on the first service availability indicator; and determine whether to transmit a second service request based on the first service availability estimate.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Figure 1:
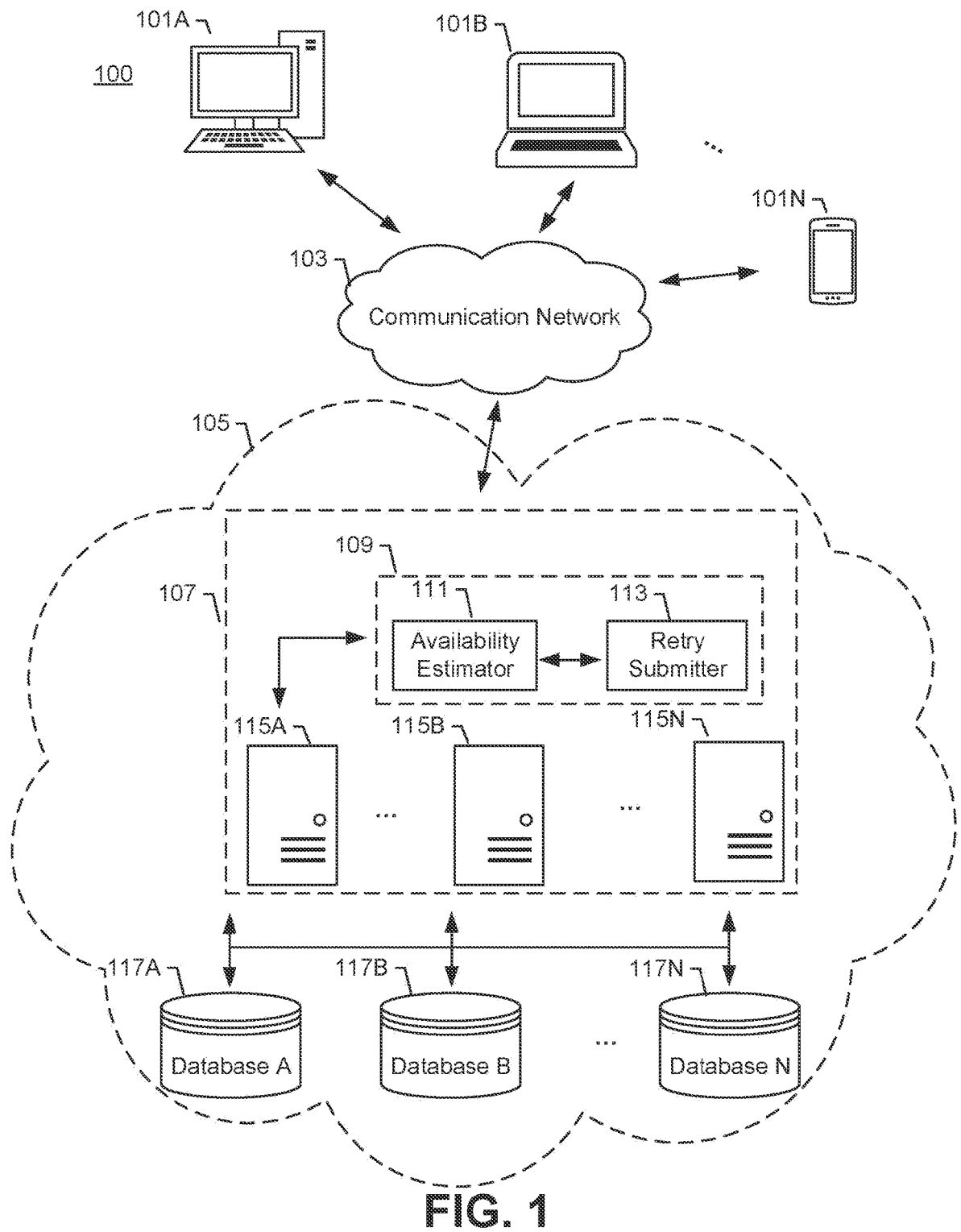
Figure 2:
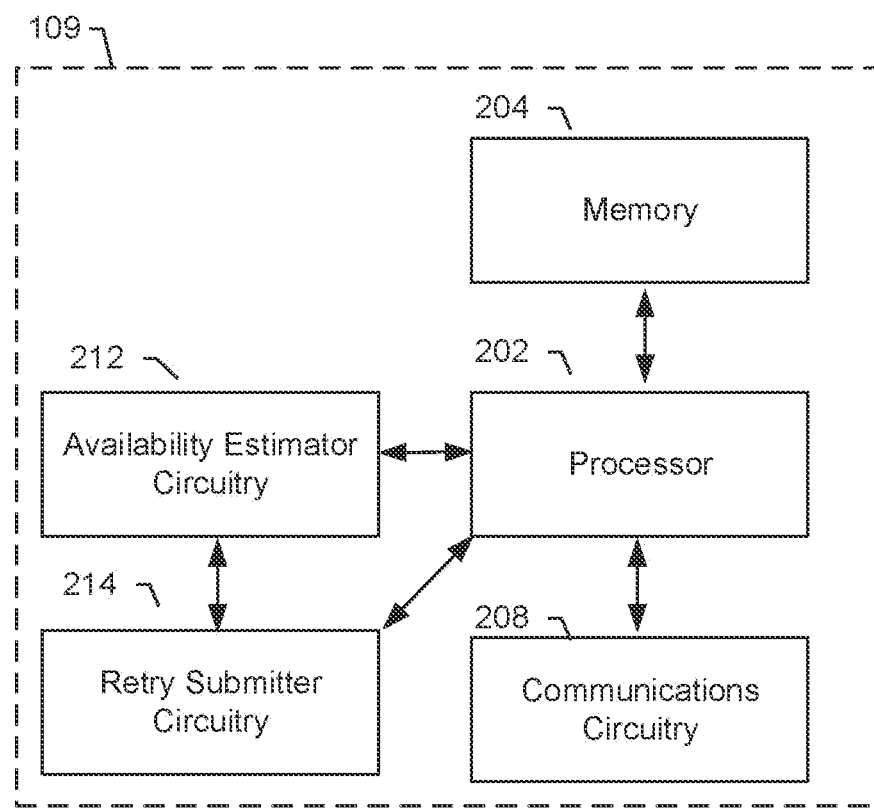
Figure 3:
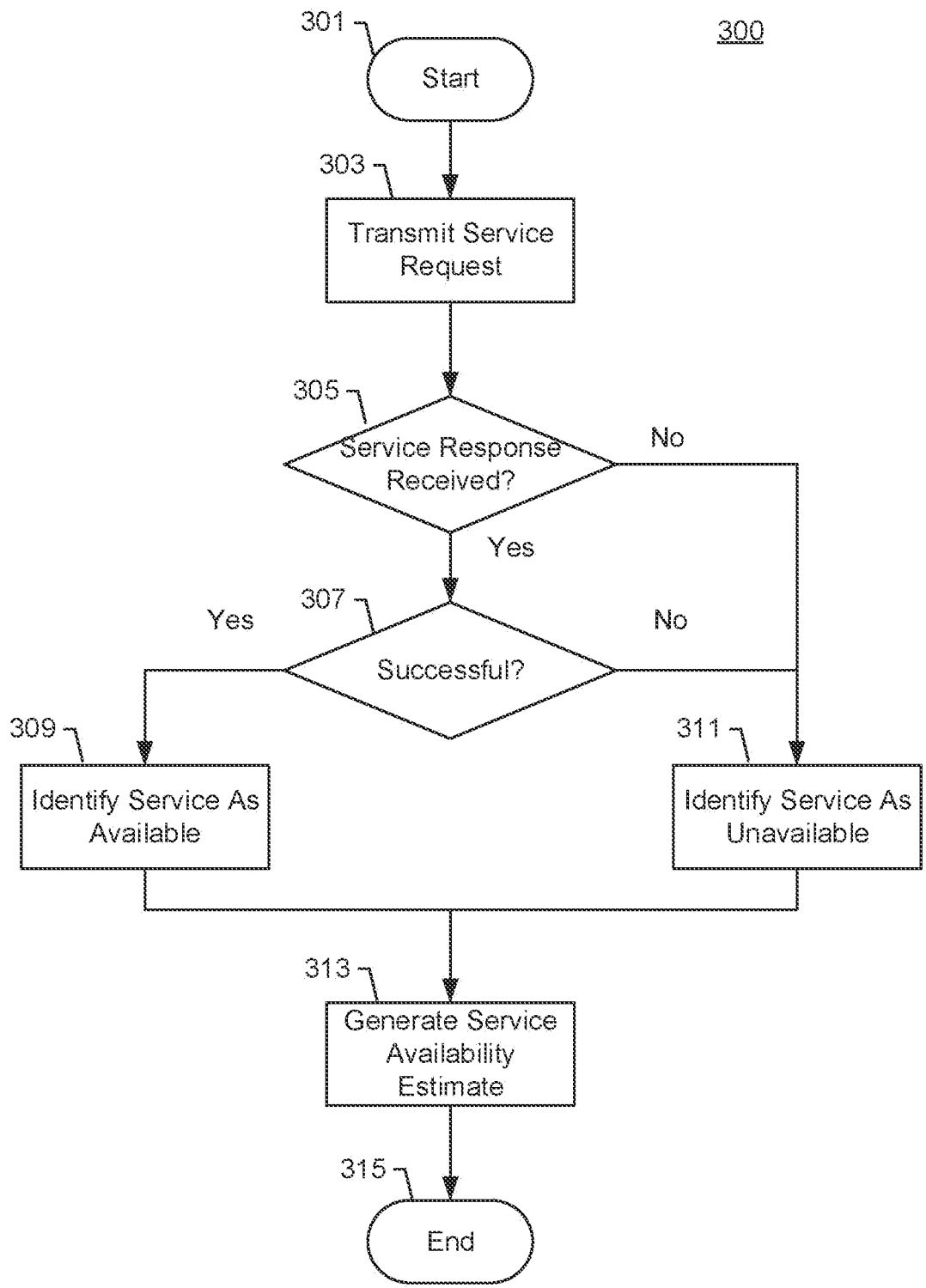
Figure 4:
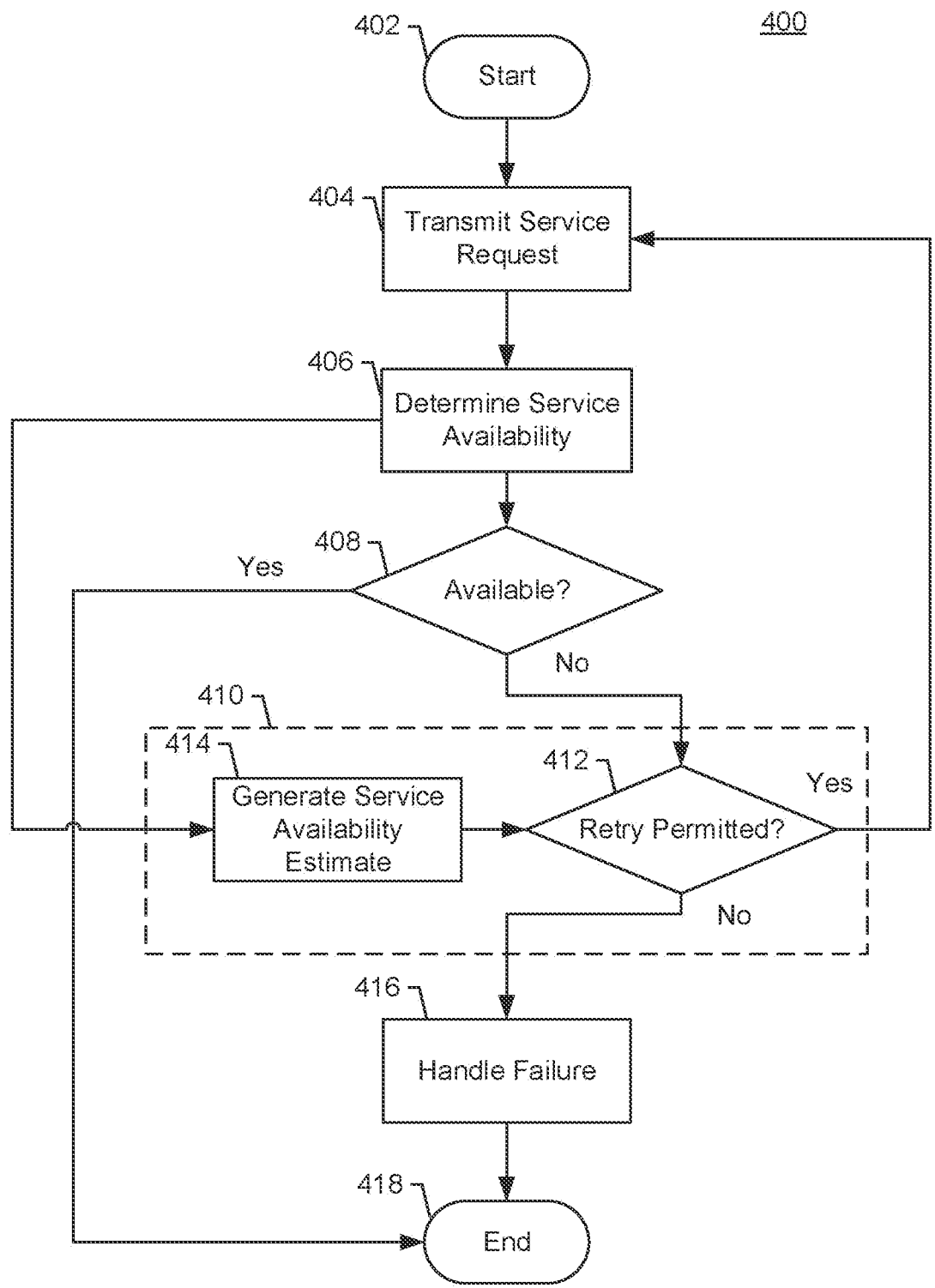
Figure 5:
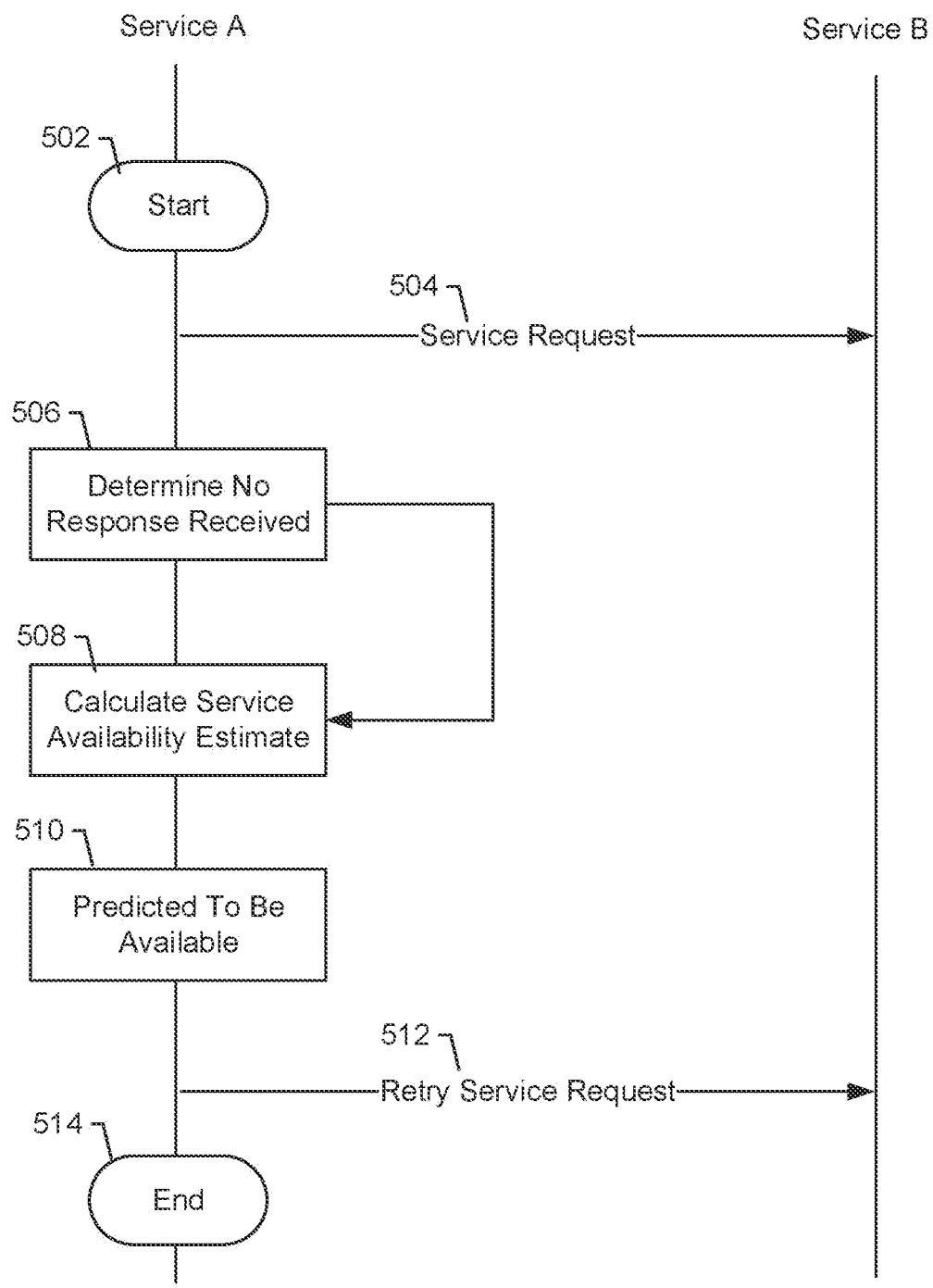
Figure 6:
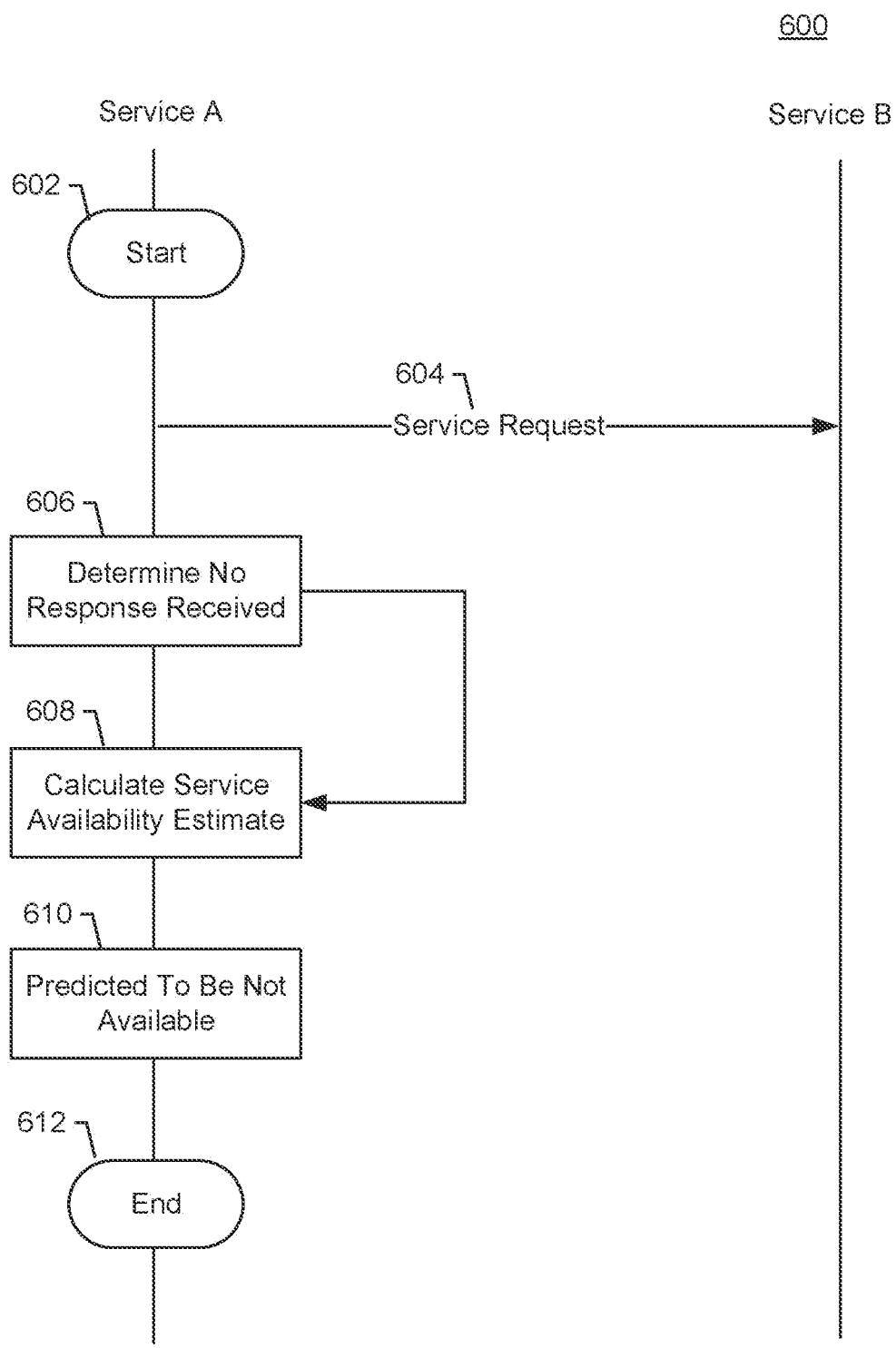
Figure 7:
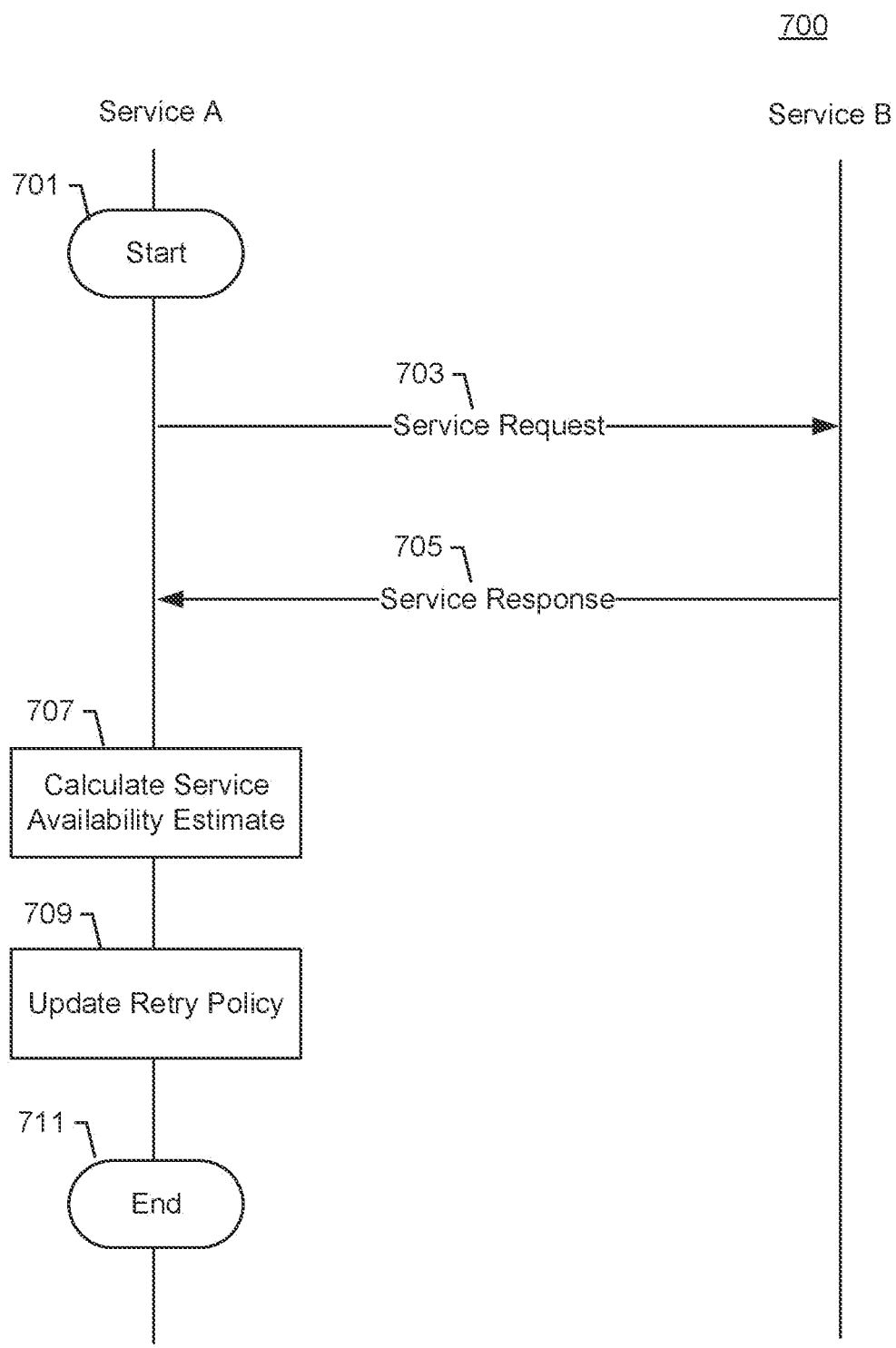
Figure 8:
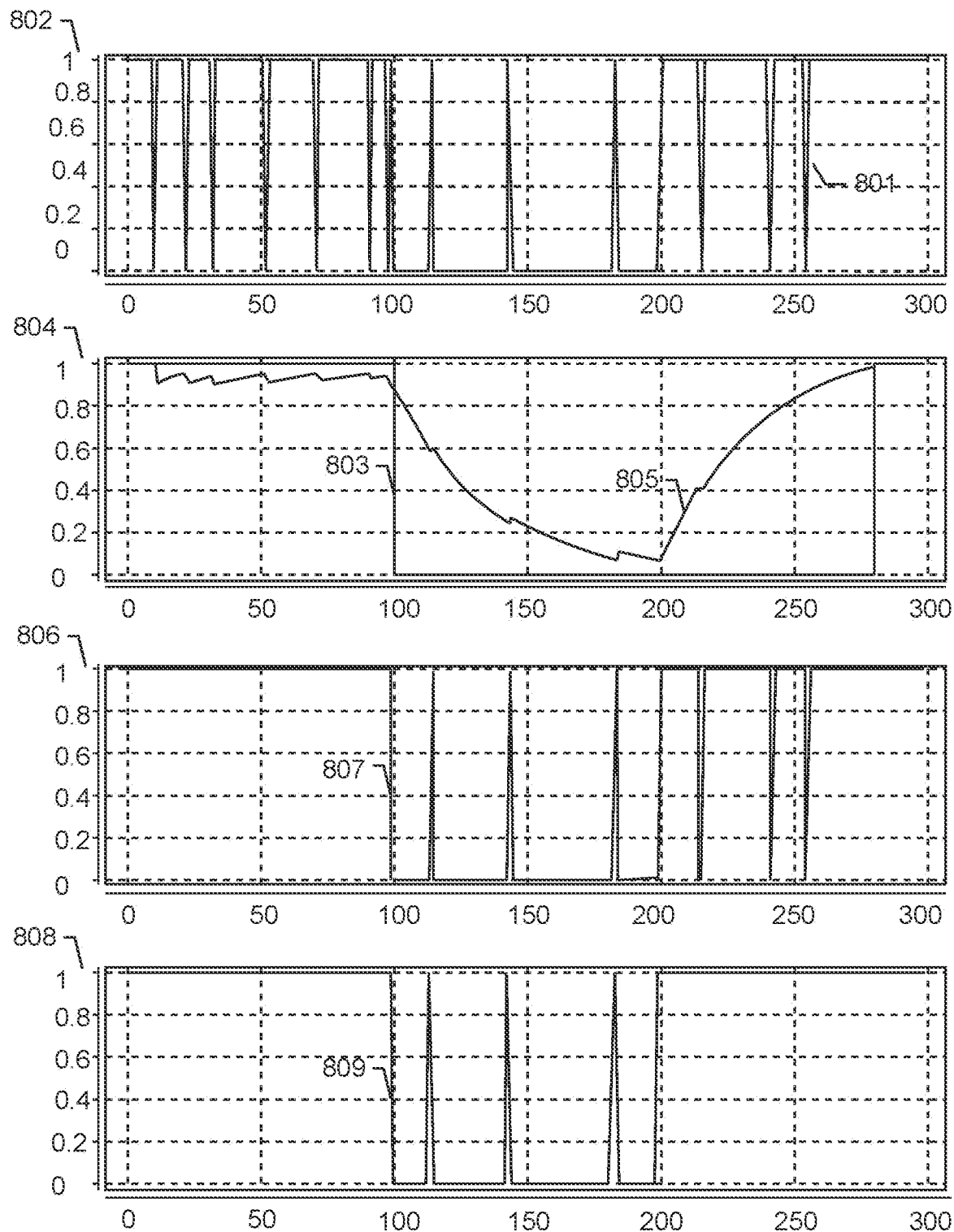

Having thus described some embodiments in general terms, references will now be made to the accompanying drawings, which are not necessarily drawn to scale, and wherein:

FIG. 1 is an example system architecture diagram illustrating an example network resource service platform in communication with client devices in accordance with some embodiments of the present disclosure;

FIG. 2 is an example system infrastructure diagram illustrating an example system resource management server in accordance with some embodiments of the present disclosure;

FIG. 3 is an example flow diagram in accordance with some embodiments of the present disclosure;

FIG. 4 is an example flow diagram in accordance with some embodiments of the present disclosure;

FIG. 5 is an example data flow diagram in accordance with some embodiments of the present disclosure;

FIG. 6 is an example data flow diagram in accordance with some embodiments of the present disclosure;

FIG. 7 is an example data flow diagram in accordance with some embodiments of the present disclosure; and FIG. 8 illustrates example diagrams showing various features of the present disclosure in accordance with some embodiments described herein.

DETAILED DESCRIPTION OF VARIOUS EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in one embodiment," "in some embodiments," "according to one embodiment," and the like generally mean that the particular feature, structure, or characteristic following the phrase may be included in at least one embodiment of the present disclosure, and may be included in more than one embodiment of the present disclosure. Such phrases do not necessarily refer to the same embodiment.

Overview

Various embodiments of the present disclosure relate generally to generating availability estimates for resource services in a network system and improving availability of a service by employing a dynamically adjustable retry policy. Various embodiments of the present disclosure may enhance the accuracy of real-time availability estimates and provide improvements in data management and communication.

In a computer network system that provides various services, it is often required to monitor, estimate and/or predict availabilities (or likelihood of availability) of these provided services. In theory, a service may be "available" when it provides such a level of quality that every service request receives a non-error response. In practice, it may be unrealistic for a service to be able to satisfy this level of quality at all times, and availability may be measured as a percentage of requests that receive non-error responses.

Many systems and approaches to monitoring and estimating service availabilities are plagued by technical restrictions and limitations. For example, one approach for measuring and estimating service availability may be collecting a statistically significant amount of samples of network service responses over a period of time (a "sampling interval"), counting errors, and dividing the error count by the number of network service requests. One of the many disadvantages of this approach is that the results often lag behind a current state by at least the duration of the sampling interval. This may lead to distortion in the results, which may qualitatively differ from reality.

For example, if a hypothetical Service A stops returning responses and become unavailable for one (1) minute, and samples are collected during a sampling interval of two (2) minutes, then the estimated availability for Service A computed using this approach may not drop below fifty percent (50%). In this example, the estimated availability may be a distorted, incomplete reflection of the reality because Service A is either one-hundred percent (100%) available or one-hundred percent (100%) unavailable, and, in reality, there may not be a point in time when Service A is fifty percent (50%) available, as the estimated availability would suggest.

Continuing from the above example, thirty (30) seconds (which is a quarter (¼) of the sampling interval) after Service A becomes one-hundred percent (100%) unavailable (which may be considered as a "catastrophic failure"), the estimated availability may indicate that Service A is seventy-five percent (75%) available, which may be another materially wrong reflection of reality.

In the above examples, it would take two (2) minutes (i.e. the sampling interval) before this approach would be able to collect a statistically significant amount of samples and generate a more accurate service availability estimate of Service A. Therefore, this approach fails to provide real-time estimates of service availability.

Some approaches for measuring and estimating service availability may shorten the sampling interval. However, such approaches may lead to many other problems and disadvantages. For example, to ensure that measurements are statistically accurate, the selected sampling interval must contain a statistically significant amount of samples. If few responses are observed during the sampling interval, a single error in the responses may be assigned a large weight value for calculating the server availability, which may distort availability estimates and trigger false alerts.

Some approaches for measuring and estimating service availability may lengthen the sampling interval, and may take the average of several samples in systems where the number of service requests is low, or where such number fluctuate over a wide range (e.g., the volume of requests drops significantly during certain times of the day). However, longer time intervals may lead to distorted measurements and delayed reaction in detecting changes in availability. Continuing from the previous example, when the sampling interval is two (2) minutes, such approaches would require two (2) minutes before it would be able to produce a more accurate service availability estimate. During these two (2) minutes, estimates calculated based on these approaches may be materially distorted from the reality.

Systems structured in accordance with various embodiments of the present disclosure may overcome challenges faced by many systems and approaches. For example, example systems structured in accordance with embodiments of the present disclosure may utilize a Kalman filter based algorithm to accurately predict the true state of the system, even if the data source contains noise (i.e., unreliable measurements).

In some embodiments, the present disclosure does not rely on collecting a statistically significant amount of samples, and may provide fast, reliable estimates in real time without undue memory allotments or additional data storage devices. For example, systems structured in accordance with various embodiments of the disclosure may generate an accurate service availability estimate as soon as the service stops returning responses. Because systems according to the present disclosure do not require collecting a statistically significant amount of samples, the delay in providing service availability estimates may be minimal or completely removed.

In some embodiments, systems structured in accordance with various embodiments of the disclosure may provide a dynamic, self-adjustable retry policy. The dynamic retry policy may describe how and when service requests should be resubmitted, details of which are described hereinafter.

As such, methods, systems, and apparatuses structured in accordance with various embodiments of the present disclosure provide specific, technical solutions to technical problems faced by existing systems, details of which are described hereinafter.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The terms "resource service," "network resource," "resource" refer to a computer program, embedded in one or more computing apparatuses, which may be configured to perform one or more designated functions and support interoperable machine-to-machine interaction over a network. In other words, resource services may provide reusable software functionalities via well-defined interfaces.

A client device and/or a resource service may generate a "service request" (which may include one or more inputs associated with the designated functions), which may be transmitted to another resource service. In response to receiving a service request, a resource service may generate a "service response" (which may include one or more outputs based on the one or more received inputs). For example, a network system that facilitates e-commerce transactions may include a credit card validation service. When a user submits a request to complete a transaction using a credit card, the network system may, for example, transmit a service request to the credit card validation service and provide the credit card number, the expiration date, and the Card Security Code (CSC) or Card Verification Value (CVV) as inputs in the service request so that the credit card validation service may determine whether the credit card is valid.

A resource service may have various attributes, including, for example, availability, which may indicate whether the resource service can perform one or more designated functions at a given time point or time period. In various embodiments of the present disclosure, the availability of a resource service may be indicated by a "service availability indicator," which can be expressed in various forms, such as, but not limited to, a binary value. For example, when the service availability indicator is zero (0), it indicates that the service is not available ("failure to respond"). When the service availability indicator is one (1), it indicates that the service is available ("success response"). A variety of factors may cause the resource service to be unavailable, including, for example, server overload, human error, security flaws, server operating system bugs, and the like.

As discussed above, a service request may be transmitted to the server(s) that hosts a resource service and, in response, the server(s) may return a service response if it is available, or fail to generate any service response if it is not available. Continuing from the previous credit card validation service example, a service request may be sent to the credit card validation service and, if the credit card validation service is not available, it may provide a service response in the form of an error message or an electronic alert. In some examples, when the resource service fails to provide any response within a predetermined time period subsequent to the service request being transmitted, an availability estimator circuitry may determine that the silence of the resource service may correspond to a service availability indicator indicating that the resource service is not available, details of which are described in the present disclosure.

To provide a prediction of the probability of success in generating service responses, various embodiments of the present disclosure may generate a "service availability estimate," which can be expressed and calculated in various forms. For example, a service availability estimate during a measurement period may be a percentage value based on the number of successful service responses divided by the total number of service requests. The service availability estimate may be expressed as a direct proportion (for example, 9/10 or 0.9) or as a percentage (for example, 90%).

In various embodiments of the present disclosure, a service availability threshold may be provided, which indicates a baseline availability requirement for a resource service, details of which are described in the present disclosure.

The term "system time" refers to a network system's notion of the current time and date so that various services of the network system can calibrate their respective clocks and otherwise access a common time. System time is typically measured by a system clock or by a network associated device that is designated as the system clock. For example, a network system may utilize a time server that reads the actual time from a reference clock (e.g. a connected radio clock, an atomic clock, another time server on the network or the Internet) and distributes the time data to other components of the network system.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like.

Example System Architecture for Implementing Embodiments of the Present Disclosure Methods, apparatuses, and computer program products of the present disclosure may be embodied by any of a variety of devices. For example, the method, apparatus, and computer program product of an example embodiment may be embodied by a networked device (e.g., a network resource service platform), such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), a mobile telephone, a smartphone, a laptop computer, a tablet computer, a wearable, or any combination of the aforementioned devices.

FIG. 1 illustrates an example system architecture 100 within which embodiments of the present disclosure may operate. Users may access a server resource platform 105 via a communication network 103 using client devices 101A-101N.

The client devices 101A-101N may be any computing device as defined above. Electronic data received by the server resource platform 105 from the client devices 101A-101N may be provided in various forms and via various methods. For example, the client devices 101A-101N may include desktop computers, laptop computers, smartphones, netbooks, tablet computers, wearables, and the like.

In embodiments where a client device of client devices 101A-101N is a mobile device, such as a smart phone or tablet, the client device may execute an "app" to interact with the server resource platform 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications.

Additionally, or alternatively, the client devices 101A-101N may interact with the server resource platform 105 via a web browser. As yet another example, the client devices 101A-101N may include various hardware or firmware designed to interface with the server resource platform 105.

Communication network 103 may include any wired or wireless communication network including, for example, a wired or wireless local area network (LAN), a personal area network (PAN), a metropolitan area network (MAN), a wide area network (WAN), or the like, as well as any hardware, software and/or firmware required to implement it (such as, e.g., network routers, and the like.). For example, communication network 103 may include a cellular telephone, an 802.11, 802.16, 802.20, and/or WiMAX network. Further, the communication network 103 may include a public network (such as the Internet), a private network (such as an intranet), or combinations thereof, and may utilize a variety of networking protocols now available or later developed including, but not limited to TCP/IP based networking protocols. For instance, the networking protocol may be customized to suit the needs of the server resource platform 105. In some embodiments, the protocol may be a custom protocol of JSON objects sent via a WebSocket channel. In some embodiments, the protocol may be JSON over RPC, JSON over REST/HTTP, and the like.

In some embodiments, the server resource platform 105 may comprise various resource service devices 107 and one or more databases 117A-117N. The various resource service devices 107 may include a system resource management server 109 and one or more resource servers 115A-115N. The one or more resource servers 115A-115N and the system resource management server 109 may be configured to provide resource services to the one or more client devices 101A-101N and/or other resource servers. For example, the client device 101A may transmit a service request to the resource server 115A via the communication network 103, and the resource server 115A may generate a service response based on the service request.

According to various embodiments of the present disclosure, software and/or hardware components related to the dynamic retry policy may be embedded in the system resource management server 109, and the system resource management server 109 may transmit resource service requests to one or more resource servers 115A-115N. In some embodiments, the system resource management server 109 may calculate one or more service availability estimates via the availability estimator component 111. In some embodiments, the system resource management server 109 may determine whether to resubmit service requests via the retry submitter component 113, details of which are described hereinafter. In some embodiments, the system resource management server 109 may be a sub-circuitry of the one or more resource servers 115A-115N.

It is noted that various components of the system resource management server 109 may leverage the same computer or computing apparatus to perform various operations in accordance with embodiments of the present disclosure. Similarly, various components of the resource servers 115A-115N may leverage the same computer or computing apparatus to perform various operations in accordance with embodiments of the present disclosure.

The one or more databases 117A-117N may be embodied as a data storage device such as a Network Attached Storage (NAS) device or devices, or as a separate database server or servers. In some embodiments, the one or more databases 117A-117N may be relational databases, such as MySQL databases. In some embodiments, the one or more databases 117A-117N may include information accessed and stored by the server resource platform 105.

Example Apparatus for Implementing Embodiments of the Present Disclosure

The system resource management server 109 of FIG. 1 may be embodied by one or more computing systems, such as apparatus 200 shown in FIG. 2. The apparatus 200 may include a processor 202, a memory 204, a communications circuitry 208, an availability estimator circuitry 212, and a retry submitter circuitry 214. The apparatus 200 may be configured to execute the operations described above with respect to FIG. 1 and below with respect to FIGS. 3-8. Although these components 202, 204, 208, 212, and 214 are described with respect to functional limitations, it should be understood that the particular implementations necessarily include the use of particular hardware. It should also be understood that certain of these components 202, 204, 208, 212, and 214 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present disclosure.

The processor 202 may be embodied in a number of different ways and may, for example, include one or more processing devices configured to perform independently. In some embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some embodiments, the processor 202 may be configured to execute instructions stored in the memory 204 or otherwise accessible to the processor 202. In some embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to embodiments of the present disclosure while configured accordingly. Alternatively, as another example, when the processor 202 is embodied as an executor of software instructions, the instructions may specifically configure the processor 202 to perform the algorithms and/or operations described herein when the instructions are executed.

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communications circuitry 208 may include the circuitry for interacting with the antenna/antennae to cause transmission of signals via the antenna/antennae or to handle receipt of signals received via the antenna/antennae.

The availability estimator circuitry 212 may include hardware configured to calculate service availability estimates, example details of which are described hereinafter. The availability estimator circuitry 212 may utilize processing circuitry, such as the processor 202, to perform these actions. In some embodiments, the availability estimator circuitry 212 may include a separate processor, specially configured Field Programmable Gate Array (FPGA), or Application Specific Integrated Circuit (ASIC). The availability estimator circuitry 212 may be implemented using hardware components of the apparatus configured by either hardware or software for implementing the functions described herein.

The retry submitter circuitry 214 may include hardware configured to resubmit service requests based on the service availability estimates. The retry submitter circuitry 214 may utilize processing circuitry, such as the processor 202, to perform these actions. However, it should also be appreciated that, in some embodiments, the retry submitter circuitry 214 may include a separate processor, specially configured Field Programmable Gate Array (FPGA), or Application Specific Integrated Circuit (ASIC) for performing the functions described herein. The retry submitter circuitry 214 may be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Data Flows of Embodiments of the Present Disclosure

Various methods described herein provide technical improvements on computer functionalities. For example, various processes described herein may improve the accuracy of service availability estimates, and may provide a dynamically adjustable retry policy based on the service availability estimates.

Real-Time Service Availability Estimate

Referring to FIG. 3, an example method 300 for calculating real-time service availability estimates of a resource service in accordance with some embodiments of the present disclosure is shown.

The method 300 starts at block 301. At block 303, an example apparatus (such as the client devices 101A-101N and/or the system resource management server 109 described above in connection with FIG. 1 and FIG. 2) may transmit one or more service requests to a resource service. The service request may prompt the resource service to return a service response.

For example, an availability estimator circuitry (such as the availability estimator circuitry 212 of the system resource management server 109 described above in connection with FIG. 2) may transmit a first service request to a credit card validation service at the first system time $T_0$, a second service request to the credit card validation service at the second system time $T_1$, a third service request to the credit card validation service at the third system time $T_2$, and the like.

At block 305, an availability estimator circuitry (such as the availability estimator circuitry 212 of the system resource management server 109 described above in connection with FIG. 2) may determine whether a service response has been received from the resource service.

If the availability estimator circuitry determines that the resource service does not provide any service response to the service request, for example, within a predetermined time period subsequent to transmitting the service request at block 303, the availability estimator circuitry may determine that the resource service is not available at block 311. As discussed above, a service availability indicator may indicate whether a resource service is available to provide a service response. In other words, when a resource service fails to provide a service response within a predetermined time period, the service availability indicator may indicate that the resource service is not available at block 311.

If the availability estimator circuitry determines that a service response has been received at block 305, the availability estimator circuitry may proceed to determine whether the service response indicates that the service request has been successfully processed by the resource service at block 307. If yes, then the availability estimator circuitry may determine that the resource service is available at block 309. For example, a service availability indicator may indicate that the resource service is available to provide a service response at block 309. If, at block 307, the service response does not indicate that the service request has been successfully processed by the resource service (for example, if the service response includes an error message), then the availability estimator circuitry may determine that the resource service is not available at block 311.

Continuing from the previous example, after transmitting the first service request, the availability estimator circuitry may determine a first service availability indicator associated with the credit card validation service, which may be indicative of whether the credit card validation service is available to respond to the first service request. For example, when a service response to the first service request is received and indicates that the first service request has been successfully processed, the availability estimator circuitry may determine a first service availability indicator that the service is available at the first system time $T_0$. As another example, in response to the second service request, the credit card validation service may return a service response indicating that the service is available at the second system time $T_1$, and the availability estimator circuitry may determine a second service availability indicator at the second system time T1 accordingly. As another example, when no response is received within a predetermined time period, the availability estimator circuitry may deem the credit card validation service as not available, and may generate a service availability indicator indicating that the service is not available.

At block 313, an availability estimator circuitry (such as the availability estimator circuitry 212 of the system resource management server 109 described above in connection with FIG. 2) may generate a service availability estimate based on a service availability indicator and a prior service availability estimate (if available).

Continuing from the above example, the availability estimator circuitry may generate a first service availability estimate associated with the credit card validation service at a second system time $T_1$ based on the first service availability indicator at system time $T_0$. The first service availability estimate may indicate whether the credit card validation service is predicted to be available at the second system time $T_1$.

As another example, the availability estimator circuitry may generate a second service availability estimate associated with the credit card validation service at a third system time $T_2$ based on the first service availability estimate described above and the second service availability indicator at system time $T_1$.

Similarly, subsequent service requests to the resource service may be continuously transmitted to the credit card validation service, and the availability estimator circuitry may refine the availability estimate, detailed of which are described hereinafter.

In some embodiments, the present disclosure may implement the above calculations based on the Apache® implementation of the Kalman filter algorithm. In some embodiments, other implementations of the Kalman filter algorithm can be used to facilitate the calculation.

In various embodiments of the present disclosure, the availability estimator circuitry may be configured to cause the storage of a singular last (i.e., most recent) computed service availability estimate. The value of the last computed service availability estimate may, in some embodiments, be stored in a local/fast memory (such as memory 204 of the system resource management server 109 as shown in FIG. 2), or a processor's register (i.e., device which provides fast access to stored values).

In some embodiments, the service availability indicator of a completely unavailable service may be represented as zero ("0"), and the service availability indicator of a fully available service may be represented as one ("1"). In some embodiments, an initial service availability estimate can be set to any numeric value between 0 and 1, inclusive.

Continuing from the previous example, the initial service availability estimate may reflect that, before the very first service request is transmitted to the credit card validation service, no information is available to gauge the availability of the service. Every time a service request is received by the credit card validation service, the determined service availability indicator may be fed into an availability estimator circuitry, and the availability estimator circuitry may increase or decrease the value of the service availability estimate within the [0, 1] range. As described above, after a new service availability estimate is computed, the availability estimator circuitry may replace the previous service availability estimate in the memory or register with the newly computed (i.e. last or most recent) service availability estimate.

In some embodiments, the amount of adjustment caused by a single service availability indicator may be based on a sensitivity parameter, which can be configured depending on the desired speed of adjustment and amount of random "noise" in the particular application. In some embodiments, "noise" may indicate unreliable results that do not reflect true state of service.

In some embodiments, a lower value for the sensitivity parameter may improve the amount of noise that is filtered out. However, a lower value for the sensitivity parameter may require more service responses to arrive at an accurate estimate as compared to a higher value for the sensitivity parameter. For example, the time it takes to arrive at an accurate availability estimate may be inversely proportional to the frequency at which service requests are received. The higher the frequency of the service requests, the faster that the availability estimator circuitry may compute an accurate service availability estimate.

Continuing from the previous example, the availability estimator circuitry may set an initial service availability estimate as 0.5 for the credit card validation service. The availability estimator circuitry may determine that the credit card validation service is available at $T_0$, and this response may result in increasing the estimate by a delta value D. The exact value of D may be variable, for example computed by the Kalman Filter algorithm, and may depend on the sensitivity parameter (described above), the value of the previous service availability estimate, and the service availability indicator (i.e. whether it indicates availability or unavailability).

In various embodiments of the present disclosure, an availability estimator circuitry (such as the availability estimator circuitry 212 of the system resource management server 109 as shown in FIG. 2) may retrieve a service availability threshold associated with the resource service, and compare and determine whether the service availability estimate satisfies a service availability threshold.

For example, if:

$X \geq SLA$, where X is the service availability estimate (i.e. the probability of service request succeeding), and SLA is the service availability threshold (e.g. a service level agreement), then the availability estimator circuitry may determine that the service availability estimate satisfies the service availability threshold. In this example, the resource service may be deemed as in a GOOD state, which may be numerically described as one (1) as described above. In some embodiments, SLA may be a constant defined by external system requirements.

As another example, if:

$X < SLA$, then the availability estimator circuitry may determine that the service availability estimate does not satisfy the service availability threshold. In this example, the resource service is deemed as in a BAD state, which can be numerically described as zero (0) as described above. In response to determining that the service availability estimate does not satisfy the service availability threshold, an availability estimator circuitry (such as the availability estimator circuitry 212 of the system resource management server 109 described above in connection with FIG. 2) may generate an alert message in the form of, for example, an electronic indication.

Continuing from the previous example, if the service availability threshold SLA is 0.9, and the service availability estimate X is 0.8 at a particular system time, the availability estimator circuitry may determine that the service is estimated to be in a BAD state at the particular system time. The system may further generate an electronic indication (e.g. a server notification) indicating that the service may be predicted as not able to satisfy system requirements at the particular system time.

The method 300 ends at block 315.

As described above, various embodiments of the present disclosure may apply Kalman filter algorithm for estimating the state of a resource service (i.e. whether the resource service is available or unavailable), which may be measured by a discrete variable that can take values of GOOD or BAD. The estimation may be done by sending service requests and observing responses: each correct response may indicate that service is in a GOOD state, and each incorrect response (or the lack of response) may indicate that service is in a BAD state. Various embodiments of the present disclosure may convert observed results to numeric form by assigning value "0" to the service availability indicator if it indicates a BAD state, and "1" to the service availability indicator if it indicates a GOOD state. Various embodiments of the present disclosure may then use the obtained numeric sequence as inputs for the Kalman filter algorithm, as described above.

Dynamic Retry and Error Recovery

As discussed above, in reality, no resource service can provide an all-time one-hundred percent (100%) availability. In other words, even the most well-behaved resource service occasionally does not return a valid response within an acceptable time frame. Some systems may attempt to improve overall availability by retrying failed requests (i.e. resubmitting the failed request) based on an implicit assumption that observed failures are caused by transient low-probability events (i.e. such events are not likely to be observed twice in a row). When such assumption happens to be correct, retry attempts are likely to succeed, and availability of the service may be improved. However, when this implicit assumption is wrong (i.e. when the failure is caused by non-transient persistent problems), retried requests are likely to fail. In such circumstances, these approaches of retry policy may cause a waste of processing resources.

Further, practical observations may indicate that a common cause of failures in distributed systems is the overload of some of the downstream dependent resource services. In these cases, retries may be contraindicated. If every failed request is retried, it may further increase the load on downstream dependent resource service (up to two times (2×)), and may cause a complete resource breakdown and a prolonged period of outage. As such, some systems may avoid retries and therefore fail to capture the technical benefits of implementing a retry policy.

From a broad perspective, software systems may be complex because they integrate multiple software and hardware components. For example, non-deterministic interaction of multiple components coupled with changing environmental factors may lead to random errors. "Random Error" may be defined as an error which is not likely to be observed when failed operation (such as a service request) is retried. For example, even the same environmental and interaction factors may result in variation in system behaviors, such as different execution times of repeated operations. These variations may be governed by the laws of statistics, and repeating the same operation for a large number of times may produce "outliers" (i.e. operations which are completed significantly faster or slower than the mean). A system (which has a time limit on execution of operation) may flag slow outliers as errors, which can also be described as "random errors."

Given the definition, random errors may be recovered by retrying the failed operation. However, technical challenges exist in classifying an error as a random error (i.e. predicting that retry of the operation will be successful before committing resources of the system to retry the failed operation). If error is not random, allocation of resources to retry the operation may be wasteful, and, in some cases, may exert additional pressure on downstream resource, causing cascading failure.

Various embodiments of the present disclosure overcome the technical challenges described above. For example, various embodiments may provide an intelligent retry policy, which may dynamically self-adjust in response to the state of the underlying resource service, and may resubmit failed requests only when underlying resource is in a GOOD state (for example, when the service availability estimate satisfies the service availability threshold). In other words, various embodiments of the present disclosure may generate an estimate on the probability that retry of the failed operation will succeed. Such estimate may drive the decision of whether it would be beneficial to allocate time and computing resources to retry the failed operation. Successful retry of failures due to random errors may improve availability of software systems. Avoiding retries that are not likely to succeed may conserve computing resources and protect downstream components from cascading failures.

Referring now to FIG. 4, a method 400 for determining whether to retry a failed service request is shown. The method 400 starts at block 402.

At block 404, an example apparatus (such as the client devices 101A-101N or the system resource management server 109 described above in connection with FIG. 1 and FIG. 2) may transmit one or more service requests to a resource service, similar to those described above in connection with block 303 of FIG. 3. For example, a service request may be transmitted to a credit card validation service.

At block 406, an availability estimator circuitry (such as the availability estimator circuitry 212 of the system resource management server 109 described above in connection with FIG. 2) may determine the service availability of the resource service, similar to those described above in connection with blocks 305, 307, 309, and 311 of FIG. 3. For example, the availability estimator circuitry may determine a service availability indicator, which may indicate whether the resource service is available to respond to the service request, as described above.

If the availability estimator circuitry (such as the availability estimator circuitry 212 of the system resource management server 109 described above in connection with FIG. 2) determines that the resource service is available at block 408, the method 400 ends at block 418.

If the availability estimator circuitry (such as the availability estimator circuitry 212 of the system resource management server 109 described above in connection with FIG. 2) determines that the resource service is not available at block 408, the method 400 proceeds to the dynamic retry policy component 410.

Continuing from the previous example, the method 400 may determine whether the credit card validation service is available based on the service availability indicator. If yes, then the method 400 ends. If no, then the method 400 proceeds to determine whether to resubmit the same service request (or another service request) to the credit validation service based on the dynamic retry policy component 410.

The determination of whether retry is permitted at block 412 may be based on the service availability estimates generated at block 414. The calculation of service availability estimates may be implemented in accordance with various embodiments of the present disclosure, such as, for example, based on the service availability determined at block 406 and in accordance with method 300 described above in connection with FIG. 3.

If the service availability estimate indicates that the resource service is predicted to be available (for example, if the service availability estimate satisfies the service availability threshold as described above in connection with FIG. 3), then retry (e.g. resubmitting the service request) may be permitted at block 412, and the method 400 may return to block 404 to resubmit the service request.

If the service availability estimate indicates that the resource service is predicted to be not available (for example, if the service availability estimate does not satisfy the service availability threshold as described above in connection with FIG. 3), then retry is not permitted at block 412, and the method 400 proceeds to block 416.

As block 416, an example apparatus (such as the system resource management server 109 described above in connection with FIG. 1 and FIG. 2) may perform operations to handle failure. In some embodiments, the example apparatus may generate an electronic indication that the subsequent service request is not transmitted.

In some embodiments, information about the failure may be written to a log file associated with the resource service, and the log file may indicate the frequency and/or failure count associated with the resource service. For example, the example apparatus may continuously monitor the content of the log file and aggregate information regarding failures associated with the resource service. In response to determining that the frequency and/or failure count satisfies a failure alert threshold, the example apparatus may trigger generation of an electronic alert.

Continuing from the previous example, if the method 400 determines that the credit card validation service is not available based on the service availability indicator, then the method 400 proceeds to determine whether resubmitting the service request is permitted based on the service availability estimate. If the service availability estimate indicates that the credit card validation service is predicted to become available, then the method 400 proceeds to resubmitting the service request. If the service availability estimate indicates that the credit card validation service is not predicted to become available, then the method 400 will not resubmit the service request.

The method 400 ends at block 418.

Referring now to FIG. 5, an example data flow 500 between Service A and Service B in accordance with various embodiments of the present disclosure is shown.

The data flow starts at step 502. At step 504, Service A may transmit a service request to Service B. At step 506, Service A may determine that no response is received from Service B within a predetermined time period subsequent to transmitting the service request. As described above, Service A may determine that Service B is not available, and the service availability indicator associated with Service B may indicate such condition accordingly.

At step 508, Service A may calculate the service availability estimate of Service B, which may be implemented in accordance with various embodiments of the present disclosure, such as the method 300 described above in connection with FIG. 3. In some examples, the service availability indicator determined in step 506 may be used as input to computations applied at step 508. For example, the service availability estimate may have an initial value of 0.5 prior to step 506. At step 508, the service availability estimate may be refined based on the determination that no response is received at step 506.

At step 510, Service A may determine that Service B is predicted to be available at a subsequent system time (for example, the service availability estimate calculated at step 508 satisfies a service availability threshold). In response to the determination, Service A may retry (e.g. resubmit) the service request to Service B at the subsequent system time at step 512.

The data flow 500 ends at step 514.

Referring now to FIG. 6, an example data flow 600 between Service A and Service B in accordance with various embodiments of the present disclosure is shown.

The data flow starts at step 602. At step 604, Service A may transmit a service request to Service B. At step 606, Service A may determine that no response is received from Service B within a predetermined time period subsequent to transmitting the service request. As described above, Service A may determine that Service B is not available, and the service availability indicator associated with Service B may indicate such condition accordingly.

At step 608, Service A may calculate the service availability estimate of Service B, which can be implemented in accordance with various embodiments of the present disclosure, such as the method 300 described above with reference to FIG. 3. In some examples, the service availability indicator determined in step 606 may be used as input to computations applied at step 608. For example, the service availability estimate may have an initial value of 0.5 prior to step 606. At step 608, the service availability estimate may be refined based on the determination that no response is received at step 606.

At step 610, Service A determines that Service B is predicted to be not available at a subsequent system time (for example, the service availability estimate calculated at step 608 does not satisfy a service availability threshold). In response to the determination, Service A does not retry (i.e. no resubmission of) the service request to Service B at the subsequent system time.

The data flow 600 ends at step 612.

Referring now to FIG. 7, an example data flow 700 between Service A and Service B in accordance with various embodiments of the present disclosure is shown.

The data flow starts at step 701. At step 703, Service A may transmit a service request to Service B. At step 705, Service A may receive a service response from Service B within a predetermined time period subsequent to transmitting the service request. As described above, Service A may determine that Service B is available, and the service availability indicator associated with Service B may indicate such condition accordingly.

At step 707, Service A may calculate the service availability estimate of Service B, which can be implemented in accordance with various embodiments of the present disclosure, such as the method 300 described above with reference to FIG. 3. In some examples, the service availability indicator determined in step 705 may be used as input to computations applied at step 707. For example, the service availability estimate may have an initial value of 0.5 prior to step 705. At step 707, the service availability estimate may be refined based on the determination that a response is received at step 705.

At step 709, Service A may update the retry policy for Service B based on the service availability estimate calculated at step 707, in accordance with various embodiments of the present disclosure, such as the method 300 described above with reference to FIG. 3 and the method 400 described above with reference to FIG. 4.

The data flow 700 ends at step 711.

FIG. 8 shows charts 802, 804, 806, and 808, which illustrate various results of an example network resource service platform that may implement dynamic retry policies in accordance with various embodiments of the present disclosure. More specifically, FIG. 8 illustrates that applying a dynamic retry policy in accordance of various embodiments of the present disclosure may improve average availability of the system at a lower computing resource expense than a static retry policy.

Chart 802 illustrates an availability indicator curve 801 of a hypothetical target service S. When the service S is available, the availability indicator may be equal to "1." When the service S is not available, the availability indicator may be equal to "0." For example, when the service S does not return a service response, or returns an error message, it may be shown in the chart 802 as a "0" on the availability indicator curve 801. Based on chart 802, the hypothetical target service S may have an overall availability of 64.0% for a total of 300 service requests.

Chart 804 shows the results when a dynamic retry policy is implemented for service S in accordance with various embodiments of the present disclosure. The curve 805 may indicate the service availability estimates for service S, which can be calculated in accordance with various embodiments of the present disclosure, such as, for example, the method 300 described above with reference to FIG. 3. The curve 803 may indicate the range of time during which the dynamic retry policy allows retries to proceed. When the service S is predicted as not available, there is no retry allowed.

Chart 806 demonstrates the effects of applying a dynamic retry policy for processing results of service S, where curve 807 shows a 66.0% availability at the cost of only 308 requests. In contrast, Chart 808 demonstrates the effects of applying a static retry policy (which is configured to retry every failed request only once). As curve 809 shows, the static retry policy provides a 69.0% availability at the cost of 407 requests.

As shown in FIG. 8, the example dynamic retry policy may boost the observed availability of the target service S by 2% compared to the original results when no retry policy is applied at all (66% in chart 806 as compared to 64% in chart 802). This improvement is achieved at the cost of submitting only 8 additional requests (308 total requests in chart 806 as compared to the original 300 requests in chart 802). The number of requests reflects the amount of computing resources required to carry out the operations. In other words, the cost of 2% boost in availability is achieved at the cost of around 2.5% increase in processing costs.

As shown in chart 808, the static retry policy may boost availability to 69%. However, this additional improvement comes at much higher cost of extra 107 requests (407 requests total in chart 808 as compared to the original 300 requests in chart 802). In other words, the 5% boost in availability is achieved at the cost of around 36% increase in processing costs.

Comparing the effects of static retry policy in chart 808 to dynamic retry policy in chart 806, the extra 3% improvement in availability came at a cost of 99 additional requests, or 33% increase in processing costs. Thus, the example dynamic retry policy is a more computationally efficient (costing less computing resource) approach to boosting the observed availability of target service S.

Further, FIG. 8 shows the distribution of additional retry requests over the lifetime of the target service S. For the dynamic retry policy, most of the retries (additional requests) may be applied when service S is in relatively good health (i.e. when service S is available). When the lack of GOOD state from service S indicates that service is in distress, the dynamic retry policy may disable the retries.

For the static retry policy, the opposite may be true as shown in FIG. 8: most of the reties happen when service S returns a majority of BAD state, which indicates that it is in distress. During this period, the static retry policy effectively doubles the processing load on the distressed service. This aspect of static retry policy behavior may make it unacceptable for most distributed applications: increasing load on distressed service may likely to exacerbate the problem and prevent self-recovery. In contrast, the example dynamic retry policy does not have this negative side effect. Therefore, the example dynamic retry policy in accordance with various embodiments of the present disclosure provides technical improvements over the conventional designs.

Additional Implementation Details

Although example processing systems have been described in FIGS. 1-2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random-access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as description of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed:

1. An apparatus comprising at least one processor and at least one non-transitory memory storing program code, wherein the at least one non-transitory memory and the program code are configured to, with the at least one processor, cause the apparatus to:
   transmit, to a resource service, a first service request;
   generate a first service availability indicator representative of whether the resource service is available to respond to the first service request;
   generate a first service availability estimate associated with the resource service based on the first service availability indicator, the first service availability estimate representing a probability that a service request to the resource service will result in a service response received from the resource service; and
   determine whether to transmit a second service request to the resource service based on the first service availability estimate.

2. The apparatus of claim 1, wherein the at least one non-transitory memory and the program code are configured to, with the at least one processor, cause the apparatus to further:
   continuously transmit subsequent service requests to the resource service;
   generate a service availability indicator representative of whether the resource service is available to respond to each subsequent service request;
   generate a service availability estimate associated with the resource service based on the service availability indicator; and
   determine whether to transmit a further subsequent service request based on the service availability estimate.

3. The apparatus of claim 1, wherein generating the first service availability indicator comprises:

determining that no service response is received within a predetermined time period subsequent to transmitting the first service request; and generating the first service availability indicator indicating that the resource service is not available.

4. The apparatus of claim 1, wherein determining whether to transmit the second service request further comprises:

retrieving a service availability threshold associated with the resource service; and determining whether the first service availability estimate satisfies the service availability threshold.

5. The apparatus of claim 4, wherein determining whether to transmit the second service request comprises:

responsive to determining that the first service availability estimate satisfies the service availability threshold, transmitting the second service request to the resource service.

6. The apparatus of claim 4, wherein determining whether to transmit the second service request further comprises:

responsive to determining that the first service availability estimate does not satisfy the service availability threshold, triggering generation of an electronic indication that the second service request is not transmitted.

7. The apparatus of claim 6, wherein the at least one non-transitory memory and the program code are configured to, with the at least one processor, cause the apparatus to further:

generate an entry to a log file associated with the resource service, wherein the log file indicates a failure count associated with the resource service.

8. The apparatus of claim 7, wherein the at least one non-transitory memory and the program code are configured to, with the at least one processor, cause the apparatus to further:

responsive to determining, based on the log file, that the failure count satisfies a failure alert threshold associated with the resource service, trigger generation of an electronic alert.

9. A computer-implemented method, comprising:

transmitting, to a resource service, a first service request;

generating a first service availability indicator representative of whether the resource service is available to respond to the first service request;

generating a first service availability estimate associated with the resource service based on the first service availability indicator, the first service availability estimate representing a probability that a service request to the resource service will result in a service response received from the resource service; and determining whether to transmit a second service request to the resource service based on the first service availability estimate.

10. The computer-implemented method of claim 9, further comprising:

continuously transmitting subsequent service requests to the resource service;

generating a service availability indicator representative of whether the resource service is available to respond to each subsequent service request;

generating a service availability estimate associated with the resource service based on the service availability indicator; and determining whether to transmit a further subsequent service request based on the service availability estimate.

11. The computer-implemented method of claim 9, wherein determining the first service availability indicator comprises:

determining that no service response is received within a predetermined time period subsequent to transmitting the first service request; and generating the first service availability indicator indicating that the resource service is not available.

12. The computer-implemented method of claim 9, wherein determining whether to transmit the second service request comprises:

retrieving a service availability threshold associated with the resource service; and determining whether the first service availability estimate satisfies the service availability threshold.

13. The computer-implemented method of claim 12, wherein determining whether to transmit the second service request comprises:

responsive to determining that the first service availability estimate satisfies the service availability threshold, transmitting the second service request to the resource service.

14. The computer-implemented method of claim 12, wherein determining whether to transmit the second service request comprises:

responsive to determining that the first service availability estimate does not satisfy the service availability threshold, triggering generation of an electronic indication that the second service request is not transmitted.

15. The computer-implemented method of claim 14, further comprising:

generating an entry to a log file associated with the resource service, wherein the log file indicates a failure count associated with the resource service.

16. The computer-implemented method of claim 15, further comprising:

responsive to determining, based on the log file, that the failure count satisfies a failure alert threshold associated with the resource service, triggering generation of an electronic alert.

17. A computer program product comprising at least one non-transitory computer-readable storage medium having computer-readable program code portions stored therein, the computer-readable program code portions comprising an executable portion configured to:

transmit, to a resource service, a first service request;

generate a first service availability indicator, wherein the first service availability indicator is indicative of whether the resource service is available to respond to the first service request;

generate a first service availability estimate associated with the resource service based on the first service availability indicator, the first service availability estimate representing a probability that a service request to the resource service will result in a service response received from the resource service; and determine whether to transmit a second service request to the resource service based on the first service availability estimate.

18. The computer program product of claim 17, wherein determining the first service availability indicator further comprises:

determining that no service response is received within a predetermined time period subsequent to transmitting the first service request; and generating the first service availability indicator indicating that the resource service is not available.

19. The computer program product of claim 17, wherein determining whether to transmit the second service request comprises:
   retrieving a service availability threshold associated with the resource service; and
   determining whether the first service availability estimate satisfies the service availability threshold.

20. The computer program product of claim 19, wherein determining whether to transmit the second service request comprises:
   responsive to determining that the first service availability estimate satisfies the service availability threshold, transmitting the second service request to the resource service.

\* \* \* \* \*